(12) United States Patent
Moengen (10) Patent No.: US 6,373,508 B1
(45) Date of Patent: Apr. 16, 2002

(54) METHOD AND SYSTEM FOR MANIPULATION OF OBJECTS IN A TELEVISION PICTURE

(75) Inventor: Harald K. Moengen, Oslo (NO)

(73) Assignee: Spotzoom AS, Oslo (NO)

( * ) Notice: Subject to any disclaimer, the term of this patent is extended or adjusted under 35 U.S.C. 154(b) by 0 days.

(21) Appl. No.: 09/171,424

(22) PCT Filed: Apr. 17, 1997

(86) PCT No.: PCT/NO97/00102

§ 371 Date: Mar. 23, 1999

§ 102(e) Date: Mar. 23, 1999

(87) PCT Pub. No.: WO97/40622

PCT Pub. Date: Oct. 30, 1997

(30) Foreign Application Priority Data

Apr. 19, 1996 (NO) .................................................. 961591

(51) Int. Cl.$^7$ ........................... G06F 3/14; G06F 15/00; H04N 5/272; A63F 13/00; G01S 5/00
(52) U.S. Cl. ........................ 345/848; 345/726; 345/849; 345/632; 345/419; 345/427; 348/25; 348/157; 473/415; 342/453
(58) Field of Search ................................ 345/848–849, 345/726, 719, 716, 156, 419, 427, 632–633, 672, 682–683, 629; 348/25, 29, 157, 159, 169, 589; 382/103, 154; 473/415, 570, 569; 273/371, 317; 700/91; 702/150, 152; 342/125–126, 450–451, 453, 463

(56) References Cited

U.S. PATENT DOCUMENTS

| 4,158,853 A | 6/1979 | Sullivan et al. ................ 358/93 |
| 4,675,816 A | 6/1987 | Brandon et al. ............. 364/410 |
| 5,138,322 A | 8/1992 | Nuttall ........................ 342/126 |
| 5,179,421 A | 1/1993 | Parker et al. ................ 356/152 |
| 5,346,210 A | 9/1994 | Utke et al. ..................... 273/55 |
| 5,564,698 A | 10/1996 | Honey et al. ........... 273/128 R |
| 5,729,471 A * | 3/1998 | Jain et al. ................ 345/419 X |
| 5,953,077 A * | 9/1999 | Honey et al. ................ 348/589 |
| 6,236,737 B1 * | 5/2001 | Gregson et al. ............ 382/103 |

FOREIGN PATENT DOCUMENTS

| FR | 2 636 742 | 3/1990 |
| GB | 1 290 915 | 9/1972 |
| WO | WO 97/02699 | 1/1997 |

\* cited by examiner

Primary Examiner—Raymond J. Bayerl
(74) Attorney, Agent, or Firm—Young & Thompson (57) ABSTRACT

In a method for manipulation of a movable object displayed in a television picture, the distance between the object and fixed basic positions is detected at a time t together with the distance between the object and a television camera in a known position. The object's position is converted to a position X,Y in the television camera's picture plane, generating therein a synthetic object which overlays the movable object and represents it in the television picture. In a method for generating a synthetic track which represents the path of a movable object displayed in television pictures during a period θ, the path of the object is calculated on the basis of its detected positions, and these positions are used for generating a synthetic track which is displayed in a television picture in order to represent the path of the object in the period T.

20 Claims, 9 Drawing Sheets

METHOD AND SYSTEM FOR MANIPULATION OF OBJECTS IN A TELEVISION PICTURE

BACKGROUND OF THE INVENTION

The invention concerns a method for manipulation of at least one movable, natural object in a natural television picture, wherein the television picture is generated by one or more television cameras. The invention also concerns a method for generating at least one synthetic track in a television picture, wherein the synthetic track represents the path of a movable natural object in a natural television picture during a given period θ, and wherein there is employed a method for manipulation of the movable, natural object in the television picture. Finally, the invention concerns a system for implementation of the method for manipulating at least one movable, natural object in a natural television picture, wherein the television picture is generated by one or more television cameras, together with implementation of the method for generating a synthetic track in a television picture, wherein the synthetic track represents the path of a movable, natural object in the television picture during a given period θ, and wherein a method is employed for manipulating the movable, natural object in the television picture.

In television broadcasts where a movable, natural object plays a central part in the broadcast, it can often be difficult to follow the object or the movement thereof in the television picture. This is the case, e.g., in sports broadcasts from various ball games, such as football, handball, tennis, golf and ice hockey, where the picture format used, the background of the picture, colour, light conditions etc. can make it difficult to follow the object or the movement thereof. The object may also be invisible for a brief or a considerable period because it is masked by other objects in the picture. Such problems can be a factor in influencing the popularity of the television broadcasts, which in turn can have consequences for the sponsors' choice of programs or purchase of commercials in such programs, since the viewing figures are not as high as is desirable.

In order to make a game like ice hockey more attractive to the television medium, on the basis of the usual complaint about television coverage of ice hockey matches that the puck is difficult to follow, it has been proposed to make the ice hockey puck more clearly visible in the television picture by employing a special puck which is equipped with a number of infrared emitters driven by a battery provided in the puck. On the rink the puck is tracked by sensors placed along the edge of the rink, the sensors transmitting information to a camera which is connected to a computer. The information is fed to a data processing centre where a signal is generated which is processed graphically and introduced into the television picture. The puck can thereby be caused to change shape or colour. This system has been introduced by the company Fox Sports in the USA and is employed to represent the puck, e.g., surrounded by a shining halo in some colour or other and equipped with a coloured "comet tail" when the puck is in motion, e.g. at a certain speed. The colours can, however, be altered according to the wishes of the producer. In a practical embodiment of this system which is called "FoxTrax", 16 sensors are employed around the rink and two infrared cameras which also follow the puck. The processed representation of the puck is introduced into the television pictures which are recorded by the normal television cameras, and the special colour effects such as the halo and the "comet tail" are overlaid the television signal with a delay which is not greater than between ⅙ and ⅓ of a second. "FoxTrax" is described in U.S. Pat. No. 5,564,698.

However, the system is complicated and offers limited opportunities for manipulation of the object, i.e. the picture of the puck. Another drawback is that the infrared emitters in the puck are driven by a battery which has a limited life, with a life of only 10 minutes having been quoted. This, however, is sufficient to allow the puck to be replaced during change of sides in a period of an ice hockey match, but makes a similar system less suitable in games where the object, i.e. the puck or ball, is in play for a longer period.

U.S. Pat. No. 4,675,816 (Brendon & Vinger) discloses a method for electronic localization of the ball in American football. The object of the method is to determine whether the ball has moved 10 yards forwards and provides simultaneous precise localization information about the ball and the possibility of positioning the football on the field. This method is regarded as an aid for spectators, officials and television. It comprises steps for providing a radio transmitter in the football and transferring radio signals from the football to a number of rotating receiver antennas, the antenna being directed towards the radio transmitter in such a manner that the radio waves supply accurate angular direction signals which can be used to calculate the position of the radio transmitter and the football on the field. These angular direction signals are supplied to a microprocessor which calculates the position of the transmitter and the football, with the use of a triangulation method which includes a computation stage which also indicates how far the ball has moved forwards, and the results of this computation stage can be shown on display units with a view to spectators and television viewers as well as being transferred to a control unit which is employed by the officials in order to monitor the course of the game.

From U.S. Pat. No. 5,138,322 (Nuttel) there is also known a system for continuous and precise measurement of the positions of a generally symmetrical object, such as a tennis ball, which is in motion in a predetermined three-dimensional area, such as a tennis court. In this case a number of antennas are employed which transmit radar signals to the three-dimensional area, reflected return signals from the ball being detected and compared with the transmitted signals for phase determination of the return signals, thus enabling unambiguous distances to the object or the ball to be determined. For this purpose a statistical method is employed in order to achieve an accurate determination of distance. The path of the object or the ball can be calculated simultaneously, and the system is calibrated by placing signal reflectors in different fixed positions on the court. A Doppler radar technique is employed.

Furthermore, in U.S. Pat. No. 5,346,210 (Utke & al.) there is disclosed an object localisation system, especially for localizing the ball in a special playing situation in American football. The system employs three sensors placed on one side of the field and a calibration source placed on the other side. The calibration source transmits an ultrasound signal which is received by the sensors and a ball marking unit which can be placed on the field instead of the ball also transmits an ultrasound signal which is received by the sensors, together with an RF signal which is received by the calibration source in order to switch it off. The sensors emit signals which are used by a processing unit to calculate time delays in order to determine the ball's position. Alternatively, the ball marking unit may only transmit an RF signal which is received by the sensors which in turn emit signals which are processed in order to determine time delays between the receipt of the signals in the sensors. In addition, an automatic ball marking unit which is moved on a track is controlled by the processing unit in order to create automatically a visual representation of the position of the ball.

None of the above-mentioned, known systems, however, is particularly well suited to achieve full freedom to manipulate the picture of a natural object in a television picture, all requiring the use of relatively expensive and complicated systems. Nor are they suitable for all types of games or sports and moreover they appear to be substantially restricted to use in sporting events, but other forms of television broadcasts are, however, conceivable, where it will be equally interesting to be better able to visualise a movable object in a television picture with suitable detection and processing methods.

SUMMARY OF THE INVENTION

Consequently, it is a first object of the present invention to provide a system for manipulating the picture of at least one movable, natural object in a natural television picture in such a manner that the object's position and movement are clearly visible in the television picture.

A second object of the present invention is to provide a synthetic representation of the natural object, thus enabling the synthetic representation to appear as a synthetic object in the television picture and to represent the natural object's movement and position.

A third object of the present invention is to manipulate the synthetic object in the television picture with regard to shape and colour in such a manner that the viewer will have no trouble in following the object.

A fourth object of the present invention is to determine the path of a movable, natural object and to visualise this path in the form of a synthetic track for the object in the television picture.

Finally, it is an object of the present invention to provide a system which makes it possible to detect the movement of such a natural object and to process the detected data in order to generate and manipulate a representation of the movable object in a television picture as well as generating a synthetic track which represents the movement of the natural object in the television picture.

The above-mentioned objects and other advantages are achieved with a method which according to the invention is characterized by detecting the distance between the object and at least 2 fixed basic positions in a preselected x,y,z co-ordinate system at a time t, each basic position corresponding to a known position of a detector, determining an x,y,z co-ordinate for the object in the preselected x,y,z co-ordinate system at the time t, determining the distance between the camera's lens centre and the object at the time t as an object vector in the preselected co-ordinate system, determining the television camera's optical axis in the preselected co-ordinate system at the time t as a camera vector in the preselected co-ordinate system, determining a line from the television camera's lens centre to the point of intersection between the edge of the generated television picture and the plane formed between the object vector and the camera vector at the time t as a zoom vector, the object vector being located between the camera vector and the zoom vector when the object is visible in the television picture at the time t, and when the object is not visible in the television picture at the time t the zoom vector is located between the camera vector and the object vector, and determining an X,Y position of the object referred to the television camera's picture plane and the camera vector on the basis of the object vector and the camera vector at the time t, and if the object vector is located between the camera vector and the zoom vector, to insert a synthetic object in the X,Y position in the television picture at the time t, the synthetic object constituting a representation of the natural object recorded by the camera at the time t, or if the zoom vector is located between the camera vector and the object vector at the time t, to insert a symbol in the television picture, the symbol indicating the location of the X,Y position of the natural object outside the edge of the picture referred to the television camera's picture plane and the camera vector.

The above-mentioned objects and advantages are further achieved with a method which according to the invention is characterized by calculating the path of the natural object on the basis of detected positions x,y,z for the natural object in a preselected x,y,z co-ordinate system at the time t, where t∈θ, converting the detected positions at the time t to an X,Y position in the television camera's picture plane at the time t, and generating the synthetic track in the television picture as the connecting line between all X,Y positions for the natural object in the picture planes of the natural television pictures which are recorded sequentially during the period θ.

The above-mentioned objects and advantages are further achieved by implementing the stated methods according to the invention with a system which according to the invention is characterized in that it comprises a transponder provided in the natural object and arranged to react to an optical, acoustic or electromagnetic signal received by the transponder with transmission of a response signal, at least one position module with at least 2 position detectors for transmitting optical, acoustic or electromagnetic signals and receiving response signals from the transponder and provided in respective basic positions in a preselected x,y,z co-ordinate system, together with a signal processor 1 arranged to determine the distance between a position detector and the object at a time t, a computing module connected with the signal processor and arranged to compute the x,y,z co-ordinates for the object in the preselected co-ordinate system at the time t and on the basis of the computed x,y,z co-ordinates for a number of times t to calculate a path for the object, together with an object vector given by the distance between the camera's lens centre and the object at the time t, a camera vector given by the camera's optical axis at the time t and a zoom vector between the camera's lens centre and the point of intersection between the edge of the picture and the plane formed between the object vector and the camera vector at the time t, the object vector being either located between the camera vector and the zoom vector or the zoom vector between the camera vector and the object vector, a camera control system connected with the computing module and arranged to detect or generate values for the camera settings, and a manipulator module connected with the camera control system and the computing module and arranged to a) create a synthetic object in an X,Y position for the natural object in the recorded television picture at the time t, the synthetic object constituting a representation of the natural object recorded by the camera at the time t or b) create a symbol in the television picture, the symbol indicating the X,Y position for the natural object outside the edge of the picture at the time t, c) generate and select attributes for the synthetic object, or d) generate at the time t a synthetic track in a recorded or generated television picture, the synthetic track representing the path for the natural object during a period θ before or up to the time t.

BRIEF DESCRIPTION OF THE DRAWINGS

The invention will now be discussed in more detail in connection with embodiments and with reference to the accompanying drawing, in which.

DESCRIPTION OF THE PREFERRED EMBODIMENTS

Figure 1:
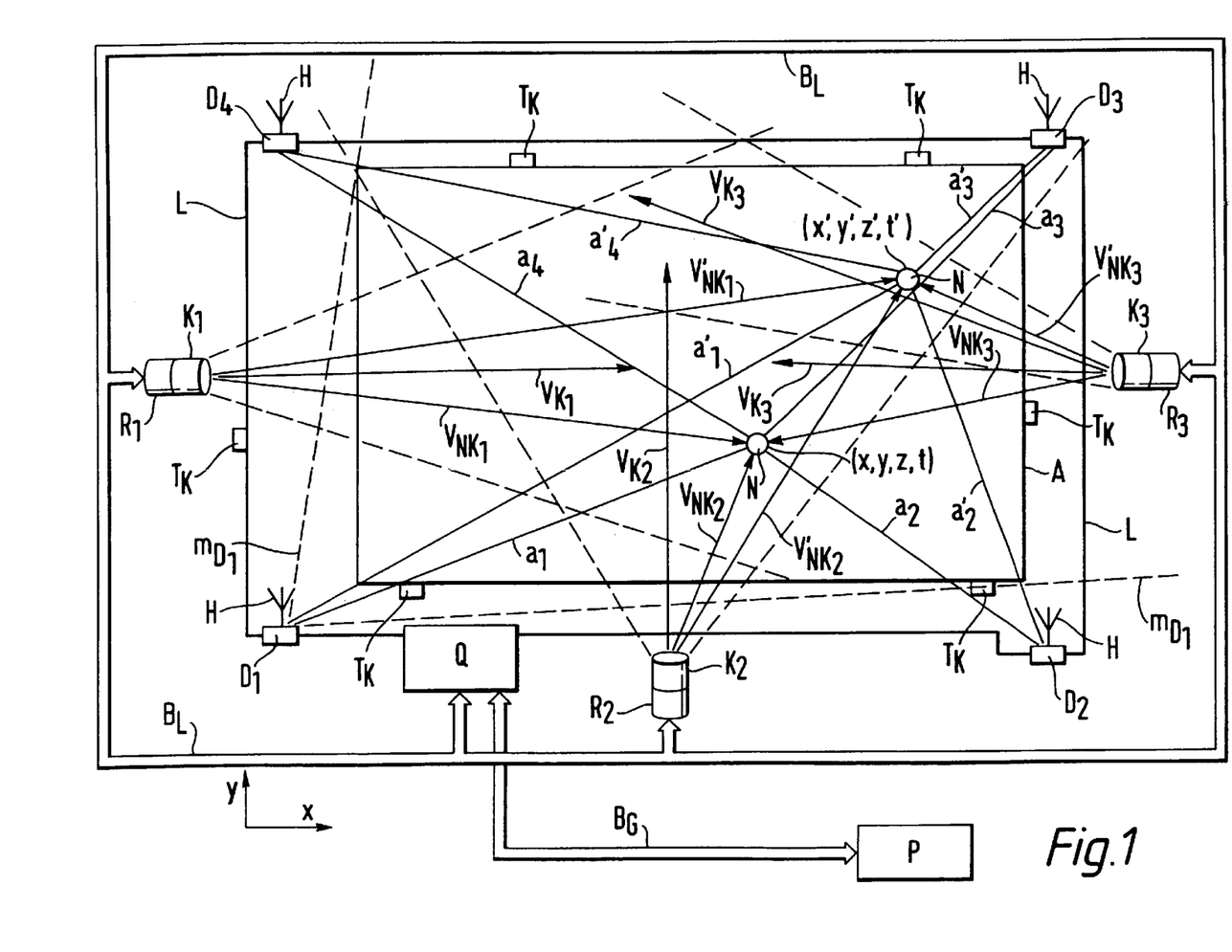
FIG. 1 illustrates a design of the system according to the present invention, e.g. in connection with a ground for a ball game.

FIG. 1 illustrates the present invention realised at a sports centre, such as a ground for ball games or an ice hockey rink A, where the area A is the projection in an x,y plane of the area which has to be covered by position detectors $D_1, \ldots D_4$. The detectors are connected via a signal line L to a data processing unit Q. The data processing unit Q is further connected via a local data bus $B_L$ to a regulator module $R_1$, $R_2$, $R_3$ which is assigned to respective television cameras K1, $K_2$, $K_3$ and comprises not shown bodies, preferably in the form of servos, for setting the cameras together with not shown sensors for detection of the camera settings, including camera angles and zoom angles. The position detectors $D_1, \ldots D_4$ comprise as shown antennas H, and these are directive, with their main lobes $m_H$ substantially covering the area A and a certain height above the plane of the area A. In FIG. 1 the main lobe for the position detector $D_1$ is indicated by broken lines $M_{D1}$. Both the position detectors $D_1, \ldots D_4$ and the television cameras $K_1$, $K_2$, $K_3$ are positioned in a preselected x,y,z co-ordinate system, since the plane of the rink A as mentioned may lie in the co-ordinate system's x,y plane, the z axis then being perpendicular to the x,y plane (orthogonal co-ordinate system). The positions of both the position detectors $D_1, \ldots D_4$ and the cameras $K_1$, $K_2$, $K_3$ are precisely defined in the x,y,z co-ordinate system. In the area A, i.e. on the rink or over it at a certain height there is located a movable object N which is illustrated in FIG. 1 in two positions x,y,z and x',y',z' at the times t and t' respectively. In other words, during a time interval $\theta = t' - t$ the movable object has moved from the position x,y,z to the position x',y',z'. The cameras $K_1$, $K_2$, $K_3$ are directed towards the area A and are set so as to cover a picture field of a certain size, in FIG. 1 for each camera indicated by broken lines. The picture axis or the optical axis in a camera K is represented by a vector called the camera vector $V_K$, e.g. for camera $K_2$, $V_{K2}$. The camera vector $V_K$ passes through the camera's lens centre and the picture field's geometrical centre axis. The cameras $K_1$, $K_2$, $K_3$ which are used naturally have zoom lenses, and the picture fields can thereby vary in size according to how the cameras $K_1$, $K_2$, $K_3$ are zoomed. Along the edge of the rink transponders $T_K$ are provided in fixed positions for calibration of the position detectors $D_1, \ldots D_4$. Corresponding transponders may furthermore also be provided both in the position detectors $D_1, \ldots D_4$ and the cameras $K_1$, $K_2$, $K_3$.

The connecting line between the lens centre in a camera K and the object N which may be a ball or puck or any other movable object, is called the object vector and designated by $V_N$, $V_{NK2}$, e.g., being the object vector for the camera $K_2$ at the time t and $V'_{NK2}$ the object vector for the camera $K_2$ at the time t'. The same applies to the other cameras. The distance from a position detector D to the object N at the time t is designated as a and at the time t' as a', for example for the position detector $D_1$ as $a_1$ and $a'_1$ respectively.

When a polling signal is emitted from a position detector D, after a certain period $\tau$ a response signal is received from the natural object N. The response signal may be a reflection of the polling pulse or it may be a response pulse from the object N, the response pulse being triggered by the polling signal from the position detector D. The time between the transmission of the polling signal and receipt of the reply signal, i.e. $\tau$, now becomes a measurement of the distance a between a position detector D and the object N. For example, the position detector $D_1$ finds that the distance to N at the time t is $a_1$, and at the time t' $a'_1$. The same applies to the remaining position detectors. If the object N is now located all the time on the x,y plane in the area A, its position will be unambiguously determined by using two position detectors, e.g. $D_1$ and $D_2$ and finding respective distances $a_1$, $a'_1$; $a_2$, $a'_2$. If the area A is three-dimensional, i.e. the position to the object N is determined by the co-ordinates x,y,z at the time t, it is necessary to have at least three position detectors, for example $D_1$, $D_2$, $D_3$. As illustrated in FIG. 1 four position detectors $D_1, \ldots D_4$ are preferably used to achieve unambiguous detection of the position of the natural object N. The position of the object N is thereby solely determined by distance measurements, i.e. by trilateration, a method which is well known to those skilled in the art and therefore will not be discussed further here. Thus, as distinct from distance determination by triangulation, it is not necessary to determine direction angles to the object N. Moreover, in the actual position determination a statistical optimization may advantageously be employed in order to reduce any positioning errors, such as estimation by means of the least squares method.

Figure 2:
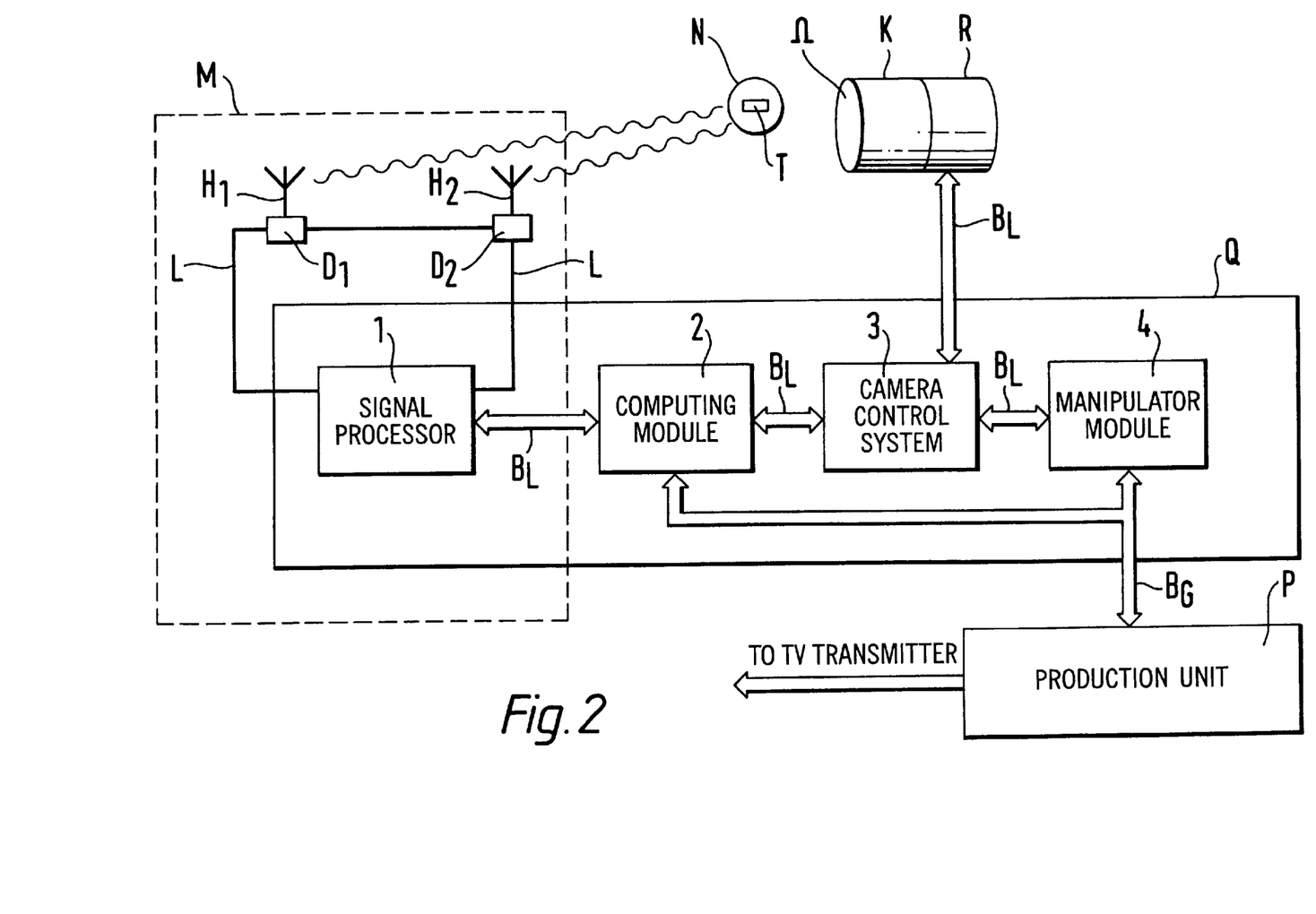
FIG. 2 is a block diagram of components in a device for processing the detected signals in the system according to the present invention, FIGS. 3a, b, c, d are a representation of the object in the picture plane of a television camera, FIGS. 4a, b, c, d are a representation of the object in the picture plane of a second television camera, where the object is partially located in positions outside the picture plane.

As illustrated in FIG. 2, according to the invention the system comprises a transponder T provided in the natural object N. The transponder T may be a passive transponder, such as a reflector for microwave signals or radar signals transmitted by the antenna H in the position detector D or it may be an active transponder which is triggered by the polling signal transmitted by the position detector D and emits a response signal which is detected by the position detector D. The position detector D with antenna H forms part of a position module M which comprises a signal processor 1, the signal processor 1 preferably being provided in a data processing unit Q. The signal processor 1 is connected via the signal line L with, for example, two or more position detectors $D_1, \ldots$, finding the detection distance a on the basis of the measured running times $\tau$. For this purpose there will be provided in the signal processor 1 components which are well known to those skilled in the art, including a clock with a very high clock rate, the clock rate at least being adapted to the frequency for the polling signals emitted from the position detectors D. The detected distances a are given to a computing module 2 which by means of trilateration calculates the positions x,y,z at different times t and thereby also the path of the object N on the basis of positions detected at the different times t. The computed positions are supplied to a camera control system 3 in the data processing unit Q. In the camera control system 3 values are calculated for the settings of the camera K by means of a regulator module assigned to the camera K, and the camera settings can be controlled automatically by means of a control loop provided in the camera control system 3, on the basis of the existing camera settings and detected positions for the object N. The optical system (objectives and other lenses) in the camera K are indicated schematically and designated by $\Omega$.

The regulator module R comprises not shown servos for generating the camera settings and not shown sensors for detection and recording of the camera settings. One of the sensors is an angle sensor for determining the camera angle, and use is preferably made of a triaxial angle sensor which thereby indicates the direction of the camera's optical axis or the camera vector $V_K$. The angle sensor can be calibrated by measuring the angle of direction at a fixed point. Such angle sensors are well known to those skilled in the art and therefore do not require further mention here. The camera K can naturally also be manoeuvred manually in order to set zoom angles and camera angles.

The data processing unit Q also comprises a manipulator module 4 for generating a synthetic object S which corresponds to the natural object N, the fixed position of the natural object being converted and scaled to a corresponding (projected) position X,Y in the picture plane of the camera K, taking into account the recorded values for the camera settings. Thus in the position X,Y in the camera's picture plane, via, e.g., a video generator (not shown) provided in the manipulator module 4, a synthetic object S can be created, representing the natural object N in its position X,Y in the picture plane in the camera K, and the synthetic object S can be represented with various attributes for size, shape and colour. The primary object here is that the synthetic object S which represents the natural object N should at all times display the position and/or the movement of the natural object N, as it would be represented in the television picture at any time t.

The signal processor 1, the computing module 2, the camera control system 3 and the manipulator module are all interconnected via the local data bus $B_L$, which also passes signals to and from the camera's regulator module R. If a plurality of television cameras K are assigned to the data processing unit Q, they are also naturally connected to the local data bus $B_L$. From the data processing unit Q a global data bus $B_G$ leads to a production unit P which takes care of the actual production of the television broadcast and may transfer the pictures to the television station or the television transmitter.

In the production unit P there are displayed the natural television pictures recorded at any time, or possibly synthetically generated television pictures with a synthetic object S and the recorded television pictures with the synthetic object overlaid in the correct position, thus enabling the producer to select the camera and the picture which is desired to be represented at any time during a television broadcast and transmit the pictures via a standard TV line to the television transmitter. If only a data processing unit Q is employed, the production unit P and the data processing unit Q may preferably be integrated into one unit, but if a plurality of data processing units are provided, the system may be completely decentralised, with all the data processing units thus being connected to the production unit via the global data bus $B_G$.

Figure 3A:
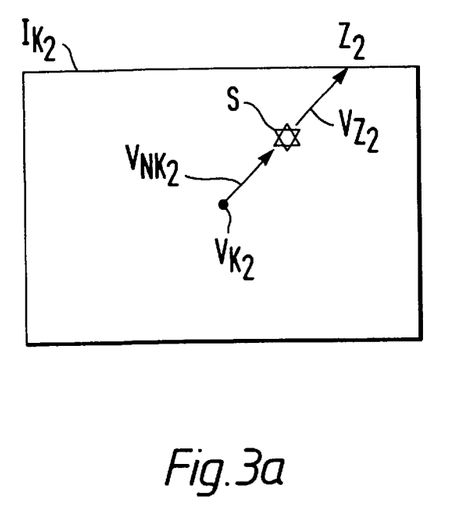
Figure 3B:
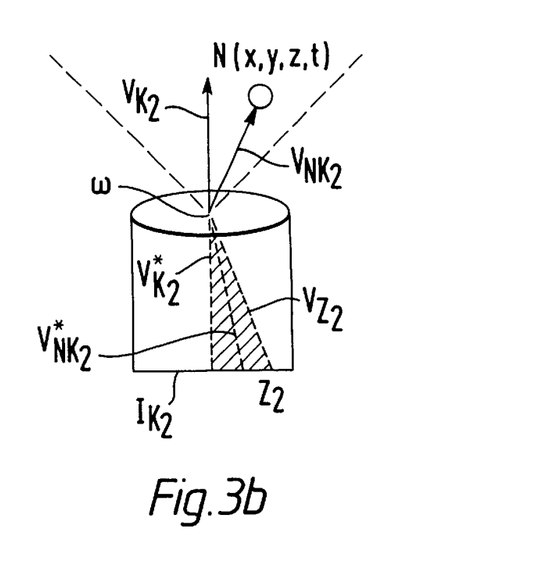
Figure 3C:
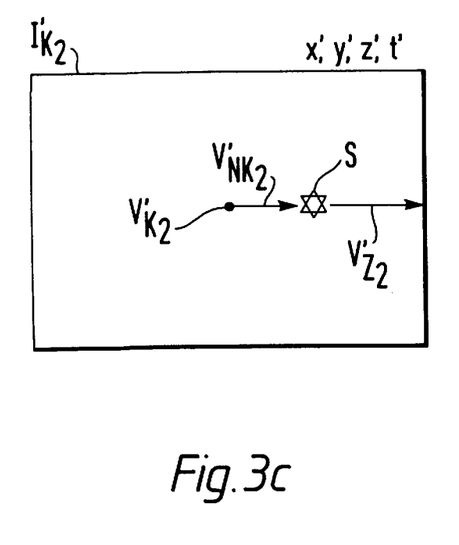
Figure 3D:
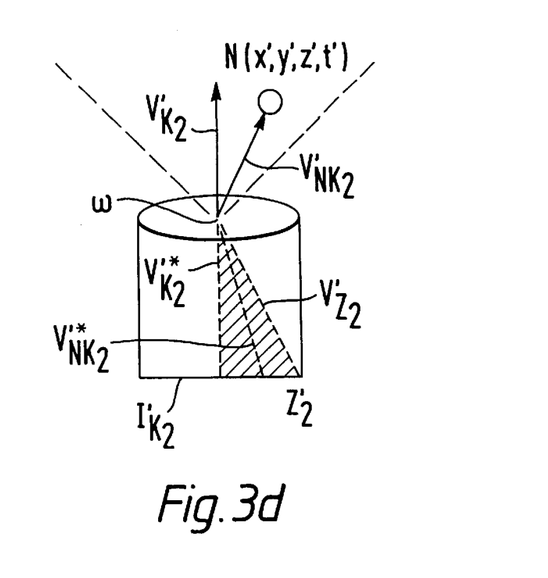
Figure 4A:
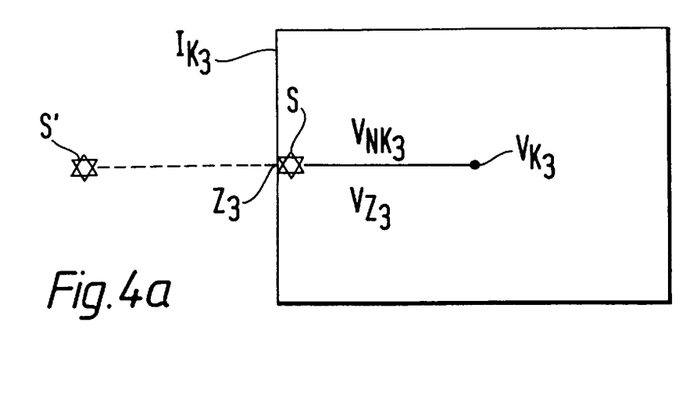
Figure 4B:
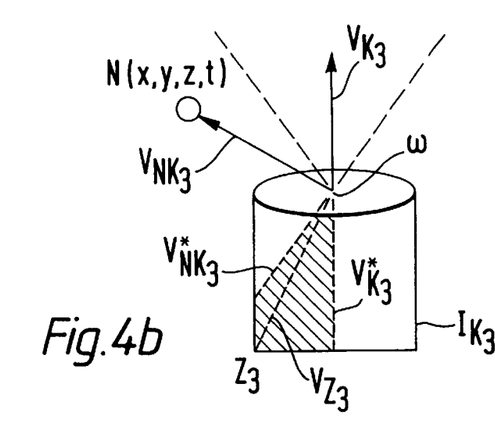
Figure 4C:
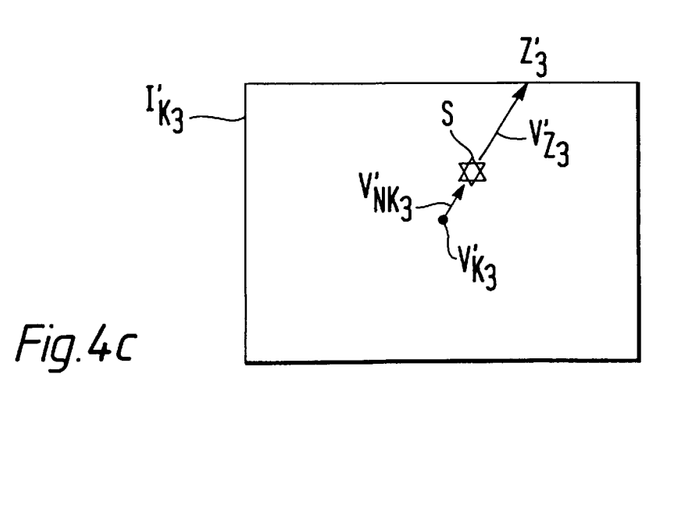
Figure 4D:
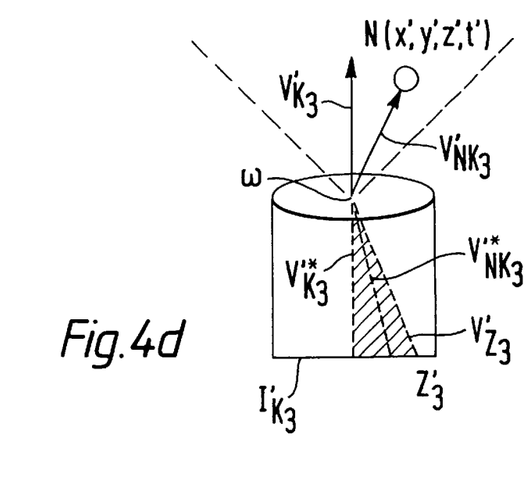

The representation of the synthetic object S in a television picture will now be described in more detail with reference to FIGS. 3 and 4. As illustrated in FIGS. 3a and 3b, camera $K_2$, for example, records in a known position and with a known camera angle and zoom angle at time t a television picture in the picture plane $I_{K2}$. The camera vector $V_{K2}$ is normally located on the picture plane $I_{K2}$ in the centre thereof. The natural object N which at the time t is located in the x,y,z position has the object vector $V_{NK2}$ which forms an angle with the camera vector $V_{K2}$ and passes through the lens centre $\omega$. As can be seen in FIG. 3b, the two vectors $V_{K2}$ and $V_{NK2}$ form a plane which intersects the edge of the picture plane $I_{K2}$ at the point $Z_2$. The connecting line between the lens centre $\omega$ and the point $Z_2$ is called the zoom vector $V_{Z2}$, as illustrated in FIG. 3b, and is thereby determined by the camera settings. The representations of the remaining vectors in the optical system $\Omega$ are marked with a star, for example $V^*_{K2}$ for the camera vector and $V^*_{NK2}$ for the object vector. The zoom vector $V_{Z2}$ also forms an angle with the camera vector $V^*_{K2}$ as illustrated in FIG. 3b. If the angle between the zoom vector $V_{Z2}$ and the camera vector $V^*_{K2}$ is greater than the angle between the object vector $V^*_{NK2}$ and the camera vector $V^*_{K2}$, the natural object is reproduced in the picture plane $I_{K2}$ and in FIG. 3a illustrated represented by a star-like object which constitutes the synthetic object S. In FIG. 3c the natural object N has moved to the position x',y',z' at the time t' and the vector parameters for the dynamic vectors, i.e. the object vector $V_N$ and the zoom vector $V_Z$ has changed, so that they are illustrated in FIG. 3c as $V'_{NK2}$ and $V'_{Z2}$ respectively. The same applies to FIG. 3d which shows the representation of the vectors in the optical system and is marked in the same way as in FIG. 3b. The natural object N is still in the picture field and can be represented by the synthetic object S. In FIG. 4 the picture plane $I_{K3}$ is shown at two different times t and t' for the camera $K_3$. At the time t the position x,y,z of the natural object falls outside the camera's picture field. As illustrated in FIG. 3b the angle between the camera vector $V^*_{K3}$ and the object vector $V^*_{NK3}$ is greater than the angle between the zoom vector $V_{K3}$ and the camera vector $V^*_{K3}$. In other words the object is outside the edge of the picture. This may be advantageously indicated in the television picture by placing the synthetic object S or an indicator therefor at the edge of the picture, i.e. at the point $Z_3$, the line between the centre of the picture and the synthetic object indicating the direction of the synthetic object. Naturally, a synthetic direction indicator can also be employed to point to the object's position outside the edge of the picture. In FIG. 4b which illustrates the picture plane $I'_{K3}$ at the time t' the movable or natural object N has moved into the picture field and can be represented by the synthetic object S as shown, the angle between the object vector $V'^*_{NK3}$ and the camera vector $V'^*_{K3}$ now being smaller than the angle between the zoom vector $V_{Z3}$ and the camera vector $V'^*_{K3}$, as can be seen in FIG. 4d.

As mentioned, the attributes of the synthetic object S may be freely chosen and the object naturally does not need to be a true representation of the natural object, either with regard to size, shape or colour. An ice hockey puck, e.g., may be generated as a highly luminous, pulsing or blinking object in a contrasting colour. Moreover, the size or colour of the object can be caused to vary in order to indicate to the viewer the apparent distance between him and the natural object, as it appears when viewing a television picture. Furthermore, the synthetic object can be provided with labels or indicators, e.g. of an alphanumerical nature or in the form of shining or blinking arrows or other visual indicators in order to indicate the distance of the object from, e.g., the camera, or also the speed, direction and position of the object. All of this can be introduced into the shown television picture in connection with the synthetic object S and overlaid the natural background in the television picture. The actual generation of the synthetic object and other indicators is performed in the manipulator module shown in FIG. 2, and may, e.g., take place by means of a not shown video generator of a type which is well known to those skilled in the art.

The detection of the natural object and the distance determination will now be described in more detail.

There are known and described in the art a number of different systems for measuring the distance to an object, e.g. by transmitting from an antenna optical, acoustic or electromagnetic signals which are reflected back to the antenna by the object whose distance has to be determined. The measured time difference between the transmission and receipt of the signals is a direct measure of the distance to the object, since the propagation velocity of the signals in the surrounding medium is assumed to be known with sufficient accuracy, and a time measuring system is employed which provides the desired accuracy in determination of the distance. For example, in U.S. Pat. No. 3,503,680 (Schenkerman) there is disclosed a distance measurement system based on a pulse radar. The technique therein disclosed takes into account the fact that the object whose distance has to be measured can move at a relatively great speed, with the result that instead of transmitting a pulse and then measuring the running time of the pulse between the object and the antenna, a sequence of pulses is used, the receipt of the echo or the return pulse of a transmitted pulse being employed to trigger the transmission of a second pulse. This process is repeated until a predetermined number of echo pulses has been received, and the time taken to receive a predetermined number of echo pulses is proportional to the distance to the object. The method can be employed both with electromagnetic signals and acoustic signals.

GP-PS no. 1,290,915 (Allard & Clark) also discloses a distance measurement system based on pulse radar of a similar nature to that disclosed in the above-mentioned U.S. patent.

Otherwise it is well known in the art to measure the distance to a movable object by means of a so-called CW radar which finds the radial speed of the movable object by means of a detected Doppler shift in the return signal or the echo signal. By employing a phase comparison it will be possible to find the distance to the movable object.

The disadvantage of using distance measurement systems based on detection of a return echo, however, is the many sources of error which can arise, e.g. due to false and spurious echoes and so-called glitter, i.e. reflected noise from ground or sea, and similarly the fact that the natural object concerned may not be suited to return an echo, even though it could conceivably be equipped with radar reflectors or a reflecting surface. In various kinds of sport, such as ice hockey, however, this is assumed to be an unsuitable method.

Instead of using a passive transponder, i.e. a return echo or reflected signals from the natural object, according to the present invention use is preferably made of an active transponder. In this case an active transponder should be understood to refer to a transceiver which is provided in the natural object and which, on detecting a polling signal, itself transmits a response signal. As a rule the transceiver must have its own energy source and a pulse transmitter for generating the response signal, and in this connection an energy source, e.g. in the form of a battery will be a substantial drawback, both because the battery can be damaged and because it will have a limited life. Since the active transponder also has to be mounted in the natural object, it has to be robust and capable of withstanding jolts and shocks as well as relative high accelerations. In this context reference may be made to the stresses to which, for example, a tennis ball, a golf ball or an ice hockey puck will be exposed when they are struck by, e.g., a racket or club.

There is therefore a requirement for the active transponder to be robust, to withstand considerable acceleration stresses and not to require its own energy source, while at the same time being small enough to be inserted in a natural object which at any rate is not larger than an ice hockey puck. A transponder of this kind should also be suitable to be worn by, e.g., individuals without causing them any inconvenience, such as participants in a game or athletes or other people whom it is desirable to record in a television picture by means of a synthetic representation of the person concerned. This will be discussed in more detail later.

Figure 5:
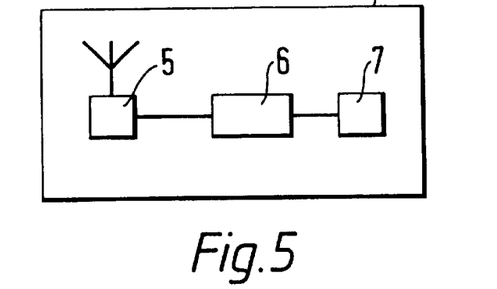
FIG. 5 is a block diagram of a transponder employed in the system according to the present invention and based on microwave technique.

A block diagram of a transponder as used according to the invention in the natural object is illustrated in FIG. 5. The transponder consists of an antenna 5, an impedance matching network 6 and a pulse transmitter 7.

As stated, the transponder's pulse transmitter can be implemented as an active unit based on battery operation or as a passive system without a battery. In the present invention, however, an active system without battery is preferably employed which has, as already mentioned, a number of operative advantages and this is preferably implemented by means of acoustic surface wave technique (SAW technique).

The transponder as illustrated in FIG. 5 and used in the present invention is therefore a so-called acoustic surface wave component. Such acoustic surface wave transponders or SAW transponders consist of a crystal plate with an input electrode and one or more output electrodes, as is illustrated and will be described in more detail in connection with FIG. 6.

Figure 6:
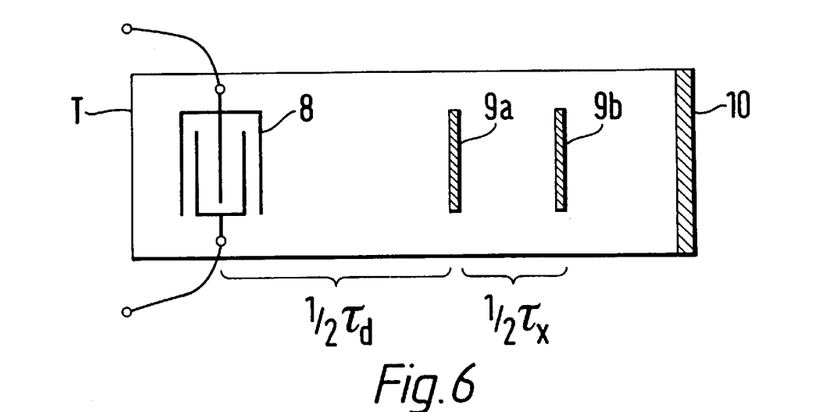
FIG. 6 is an active transponder for use with the invention and based on an acoustic surface wave component.

An SAW transponder T as illustrated schematically in FIG. 6, has long been known to those skilled in the art in and consists in principle of a crystal, e.g. of lithium niobate with a surface pattern of metal which constitutes transducers, reflectors, etc. A polling pulse from the position detector D is received by a transducer 8 which is shown in the form of a so-called interdigital transducer. The received electromagnetic energy in the polling pulse is converted in the transducer 8 to an acoustic surface wave which moves along the crystal. At a certain distance from the transducer 8 there are placed a first reflector 9a and a second reflector 9b respectively. When the acoustic wave strikes the two reflectors 9a and 9b, reflection waves are created which move back to the transducer 8. The transducer 8 will convert the two acoustic reflection waves to electromagnetic pulses which constitute the response signal which is transmitter via the transponder's antenna. At the end of the transponder T there may be provided a surface wave absorber 10. The path of the signal is illustrated schematically in FIGS. 7a and 7b.

Figure 7A:
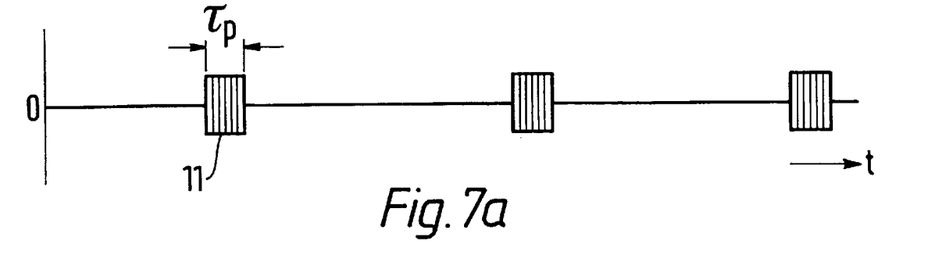
FIG. 7a is a polling signal emitted in the form of pulses from a position detector.
Figure 7B:
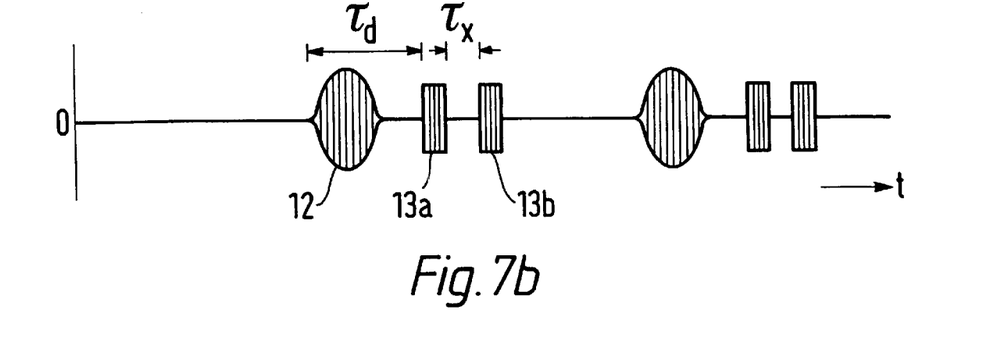
FIG. 7b is a response signal emitted in the form of a pulse sequence from the acoustic surface wave component.

When the transponder T receives an interrogator or polling pulse 11 of length $\tau_p$, as illustrated in FIG. 7a, the pulse transmitter 7, i.e. the transducer 8, is triggered, and a response signal is transmitted by the antenna after a specific time $\tau_D$. As illustrated in FIG. 7b, the response signal consists of two pulses 13a, 13b, located at a distance $T_x$ apart from each other. For different categories of natural objects the category of the object may be determined by, e.g., measuring the pulse distance $T_x$ in the position detector D which also transmits the polling signal.

In principle this technique is exactly the same as techniques for the use of radar transponders based on SAW technique, since, as is well known, SAW components are used as delay members in RF communication and detection systems. The transponder, which may be in the form of an integrated enclosed chip, can be coded by selecting a pulse distance between two reflection pulses equal to an integral multiple of, e.g., the length $\tau_p$ of the polling pulse. The transponder T may, of course, comprise more than the two reflectors 8a, 8b as illustrated in FIG. 6, and in this case it can be used to emit the response signal with a large number of different codes. In this way a transponder T based on SAW technique can be employed in detection of the distance to a large number of natural objects N, since the code thus unambiguously identifies which of the natural objects are involved. This may be relevant in cases where the method and the system according to the present invention are intended to monitor a game where several objects are employed simultaneously in the game, such as in golf or during athletics competitions where it is desirable to follow a large number of competitors each of whom is equipped with a transponder. In the case of approximately simultaneous detection of several response signals, in order to achieve an unambiguous detection it may be appropriate to use special detection techniques, e.g. based on correlation between detected, coded reply pulse sequences and pre-stored code sequences for each individual transponder. A second possibility is to use polling signals at different frequencies and corresponding frequency-tuned transponders. Finally, transponders may be employed with different delays $\tau_d$. In this case the delays must be adapted to the distance range concerned for detection, so that the response signals for the detector in respective unambiguously defined times are relative to the time for the transmission of the polling signal.

FIG. 7a illustrates a pulse pattern employed in the position detector D, where polling pulses 11 are transmitted with pulse length $\tau_p$ and with a given time interval between the polling pulses corresponding to a desired sampling frequency sequence. The response signal from the transponder T will arrive at the position detector D in the form of the pulse sequence 13a, 13b, as illustrated in FIG. 7b, while in this case the pulse shape 11 represents an echo caused by ground or sea glitter and centred around the real distance to a reflection point at or near the transponder T. However, use of a SAW component as transponder will delay the response signal by a predetermined value $\tau_d$ and the reply pulses 13a, 13b will therefore arrive some time after the glitter pulse 11 and thereby not be masked by it. The distance selected between the reply pulses 13a, 13b here is $\tau_x$ and the delay will be equal to $\tau_d$, the distance from the transducer 7 to the reflector in this case naturally corresponding to a running time of ½ $\tau_d$ and in addition the distance between each reflector corresponding to a running time of ½ $\tau_x$. The reply pulse from the transponder T will now arrive at the detector D after an interval $\tau=\tau_a+\tau_d$, wherein $\tau_a$ is the running time for an electromagnetic signal from the position detector D to the transponder T and back and $\tau_d$ the time delay entered in the transponder. To the period $\tau_d$ there will naturally be added further periods $\tau_x$ for the reply pulses from each further reflector 9 in the transponder T. What is now required of the system is that the time $\tau$ should be able to be measured with an accuracy which is preferably of the order of $10^{-1}$ m, possibly even less, and this will be within the scope of current technology. Thus the time delay $\tau_d$ and the period $\tau_x$ must be precisely known, and this can be achieved by a careful calibration of the SAW transponders used. In order to achieve such accuracy, the frequency selected for the polling signal should be at the upper end of the L band or in the S or X band, i.e. it should have a frequency of between circa 1 Mhz and 10 Mhz, or in other words a wavelength of between 30 cm and 3 cm. The clock employed in the signal processor 1 should have a rate which is adapted to the frequency of the polling signal and the response signal. Thus with present day technology distance detections can be obtained with an accuracy of the order of $10^{-1}$ m or less within the distances which will normally occur when using the method and the system according to the invention, i.e. preferably in sports arenas or the like.

In order to test and calibrate the system according to the present invention, in the corner of the area A as illustrated in FIG. 1 there can be provided permanently mounted and accurately calibrated transponders $T_K$ in fixed positions and coded in order to emit unambiguous identifying response signals. These are used to calibrate the system and the position detectors D. Transponders are also preferably provided both in the position detectors and the cameras. When mobile cameras such as "Handycam" and "Steadycam" are used, it will be possible to determine the camera positions by means of the position detectors D.

It will also be seen that by using the SAW transponders as preferred in the present invention, it will be possible to place these without difficulty in most natural objects N which it will be appropriate to follow and display in connection with a television broadcast, whether it be a football or an ice hockey puck. As mentioned, SAW transponders are very robust and capable of withstanding substantial acceleration stresses, nor do they require their own power source, while at the same time they can be designed with extremely small dimensions, measuring, for example, only a few millimeters. They may, e.g., be enclosed in a shock-absorbing material fitted inside the natural object, but otherwise no special measures are necessary to protect them from damage. At the same time it will be extremely simple to replace them if they really should be destroyed. However, they are also so inexpensive to manufacture that it will be just as easy to replace the natural object with another with a similar SAW transponder. When used in connection with other natural objects than, e.g., footballs, ice hockey pucks etc., for example worn on a person, the transponders may be designed in the form of an enclosed chip which is attached to the person and worn during the period concerned. Since the SAW transponder can be arranged to emit an unambiguous coded reply signal, the person wearing the transponder chip will also be unambiguously identifiable.

The system according to the invention may comprise a number of position modules M which are assigned to one or more respective television cameras K, each position module being arranged to cover a predefined area in the x,y,z co-ordinate system. This implies that the use of the method and the system according to the present invention is not restricted to only a well-defined area such as a field for ball games or an ice hockey rink and the like, but can be employed to cover areas of arbitrary shape and size, such as, e.g., cross-country skiing courses, Alpine skiing slopes and the like. Nor are the method and the system according to the present invention only restricted to sporting arrangements, but they can be used to cover events within large and relatively freely defined areas. Such areas can be divided into several partial areas, and the system does not necessarily have to cover each partial area or the entire area, but the use of the system may be restricted to selected partial areas.

Figure 8:
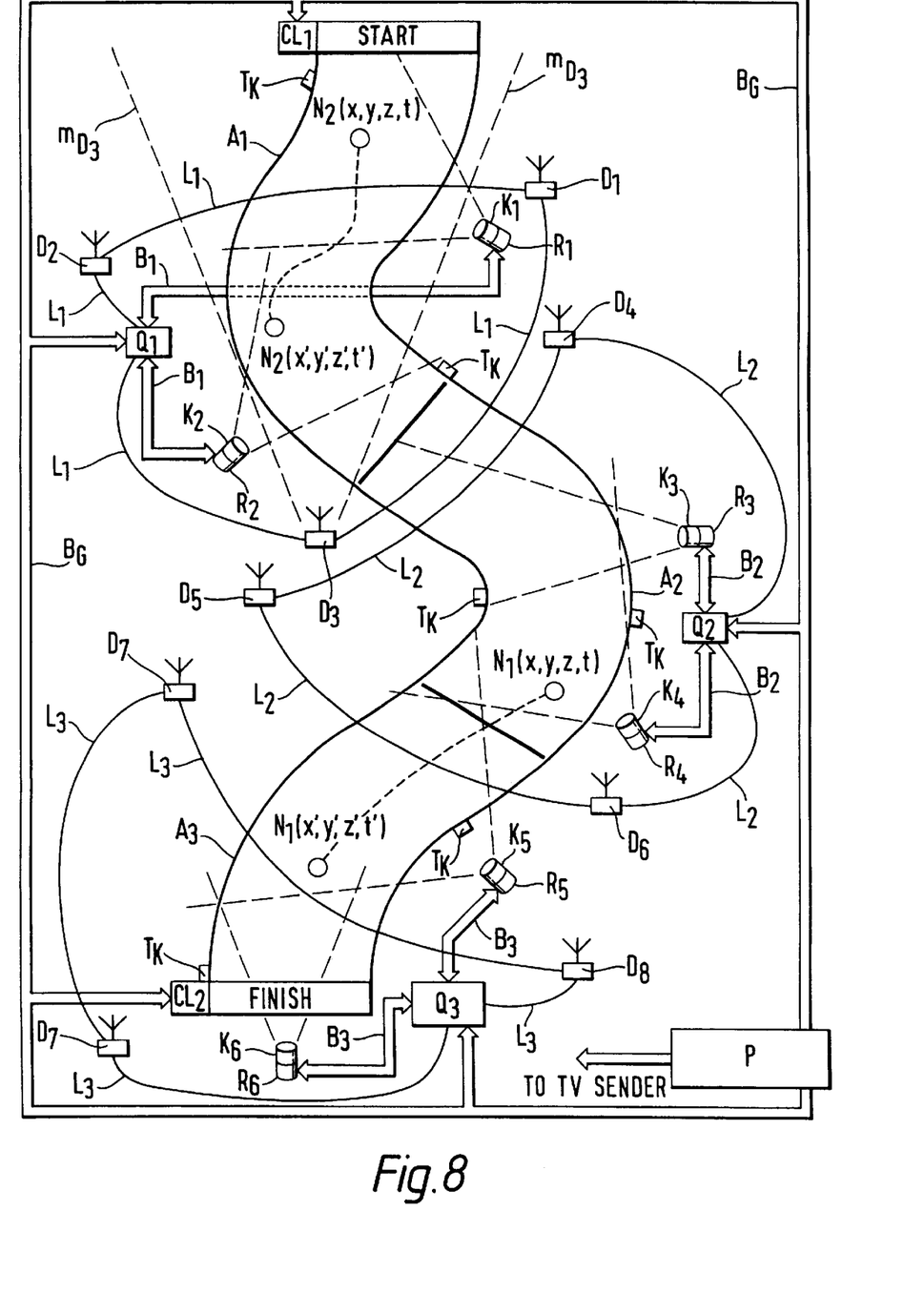
FIG. 8 is a system according to the present invention implemented for detection of several objects which are in motion in separate or connected areas, FIGS. 9a, b, c illustrate generation of a synthetic track by means of the design according to FIG. 1, FIGS. 10a, b illustrate generation of a synthetic track by means of the design according to FIG. 8, and FIGS. 11a, b illustrate generation of synthetic tracks for two objects by means of the design according to FIG. 8.

An example of a set-up of the system according to the present invention for use, e.g., in a ski run or Alpine skiing slope is illustrated in FIG. 8. Here, the area A is divided into three partial areas $A_1, A_2, A_3$. To each partial area $A_1, A_2, A_3$ there are assigned respective position modules $M_1, M_2, M_3$. The partial area $A_1$ is covered, e.g., by a position module $M_1$ with 3 position detectors $D_1, D_2, D_3$ which are interconnected via the signal line $L_1$ and thereby connected to a data processing device $Q_1$. The data processing device $Q_1$ is connected via a local data bus $B_1$ with the cameras $K_1, K_2$ via their respective regulator modules $R_1, R_2$. Typical picture fields for the cameras $K_1, K_2$ are indicated by broken lines and similarly are surrounded by the main lobe of the antenna in one of the position detectors $D_3$ indicated by broken lines $m_{D3}$. The data processing device $Q_1$ is connected to a production unit P via a global data bus $B_G$. The same applies to position modules and cameras which are assigned to the remaining partial areas $A_2, A_3$. Moreover, in each of the partial areas $A_1, A_2, A_3$ transponders $T_K$ are provided for calibrating in fixed positions, such as at the edge of each partial area. Furthermore, the global data bus $B_G$ may be connected to the timekeeping system, indicated in FIG. 8 as $CL_1$ at "START" and $CL_2$ at "FINISH" respectively.

In FIG. 8 two natural objects $N_1, N_2$ are illustrated, the first natural object $N_1$ being substantially located in the third partial area $A_3$, and the second natural object $N_2$ in the partial area $A_1$. Each of the objects is shown in two different positions x,y,z; x',y',z' at the times t and t' respectively, where it should be understood that positions and times do not need to be identical for the two objects $N_1, N_2$. The path of each of the objects $N_1, N_2$ between the first and the second position is indicated by a broken line. The distances from the position detectors D to the objects $N_1, N_2$ and their positions are determined as described earlier in connection with FIG. 1.

Since the position modules' polling signal has a high frequency and directive antennas are employed, it will be understood that the signals move substantially in a straight line. In other words they can be stopped by obstacles in the terrain and the like. By dividing up the area A into sub-areas $A_1, A_2, A_3$ which are assigned to respective subsystems of position modules D and cameras K, the entire area A will still be able to be covered by using the method and the system according to the present invention. The selected positions of the position modules D and the cameras K must therefore take topographical and other conditions into consideration.

In the area A obstacles may be encountered which prevent the objects N from being shown in the cameras' picture field. This may, e.g., be vegetation, groups of people and the like, but it will not obstruct the free passage of the detector and transponder signals employed. This means that the position of the natural object N can still be indicated in the cameras' picture field, even though the object N at the time concerned happens to be covered by obstacles which hinder visual contact. In this case the natural object N may naturally be represented by a synthetic object S in the correct position X,Y in a television picture. Such conditions can easily arise, e.g., in reports from cross-country skiing, where the skiers will be invisible due to the vegetation, even though the camera is located in a position which should in theory cover the section of the cross-country course concerned. Thus by means of the design illustrated in FIG. 8, the methods and the system according to the present invention permits a complete coverage to be obtained with indication of the position of the natural objects N, in the case of sporting events or naturally also the position of the competitors, even though they are, e.g., masked by vegetation and the like in the cameras's picture field. Neither reporters nor viewers need, therefore, to be left to guess where an anticipated favourite is located at that moment.

As mentioned above, by means of a method according to the invention a synthetic track can be generated in a television picture, the synthetic track thus being intended to represent the path of a natural object N in the television picture during a given period θ. The path of the natural object N can be calculated, as already mentioned, on the basis of detected positions x,y,z in a preselected co-ordinate system at the time t. The time t will thus lie within a period θ. The detected positions x,y,z are converted to an X,Y position in the picture plane of a relevant television camera at the time t. The synthetic track in the television picture is created as the connecting line between all X,Y positions for the natural object in the picture planes of the television pictures which are recorded sequentially during the period θ. The synthetic track may now, e.g., be displayed in a still picture which need not be recorded during the period θ, or it can be continuously updated and generated for each individual picture which is recorded during the period θ, thus creating the synthetic track cinematographically. Like the synthetic object S the synthetic track can be created with given, possibly similar attributes with regard to size, shape and colour. It may preferably be shown, e.g., as a coloured line in a contrasting colour and with indicators for direction of movement and possibly also the speed of the natural object in the path which corresponds to the synthetic track.

Figure 9A:
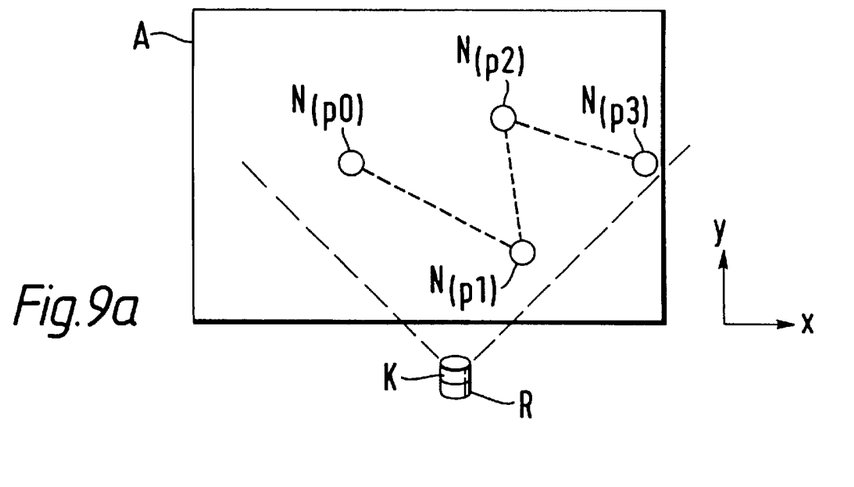
Figure 9B:
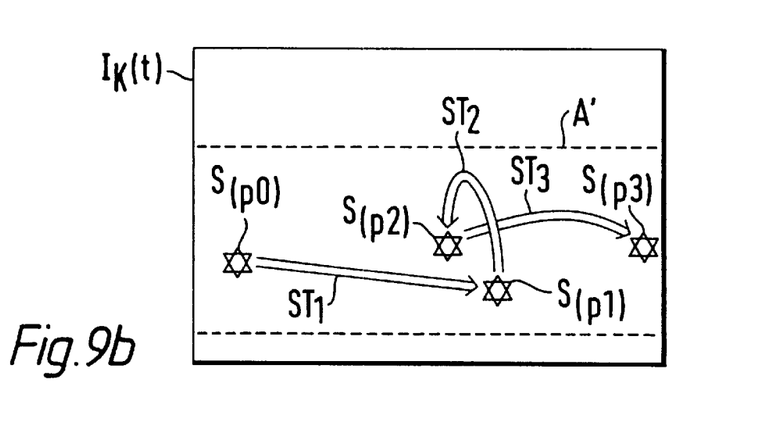

An example of generation of a synthetic track for a natural object N is illustrated in FIGS. 9a, 9b and 9c. FIG. 9a shows a path a where the natural object moves from positions $p_0$ to $p_3$ during the period θ. FIG. 9a illustrates this on the projection of the path A in an x,y plane. The path of the object N during the period θ is covered by the camera K and naturally recorded as a sequence of individual pictures by the cameras K. If camera K has the same setting during the period θ, the picture field, e.g., of the camera K in the picture plane $I_K$ will show a section A' of the area A, as illustrated in FIG. 9b. Here the natural object N is represented by a synthetic object S shown in the relevant positions $p_0, \ldots$ and with the projection of the natural object's path projected in the picture plane $I_K$ as a synthetic track between the various positions $p_0, \ldots$ for the synthetic object S as shown in the figure. If, e.g., it is a television report from a football match which is being shown, N will, naturally, usually be the football and the synthetic track will represent the ball's path from the position $p_0$ to the position $p_3$, in three dimensions, but projected into the picture plane $I_K$. $I_K(t)$ may be the final picture in the sequence which was recorded during the period T, and in this case the track shown for the synthetic object S is the path from the beginning of the period θ up to the last recorded picture during θ. It is, of course, not essential that the track should only be shown continuously in the recorded pictures during the period θ, since the synthetic track can be inserted in a freely selected still picture or in a television picture which is recorded at a time outside the period θ.

Figure 9C:
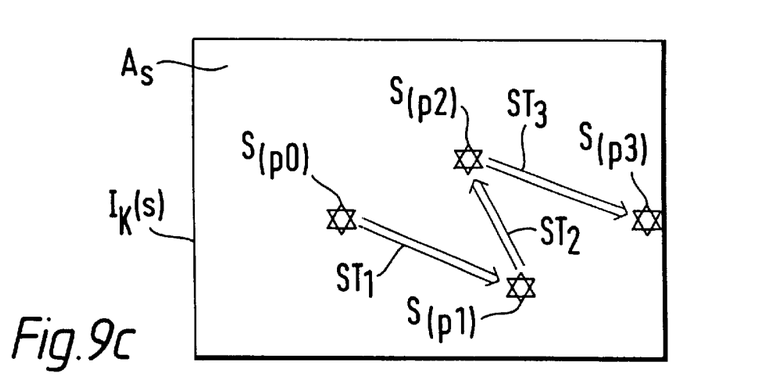
Figure 10A:
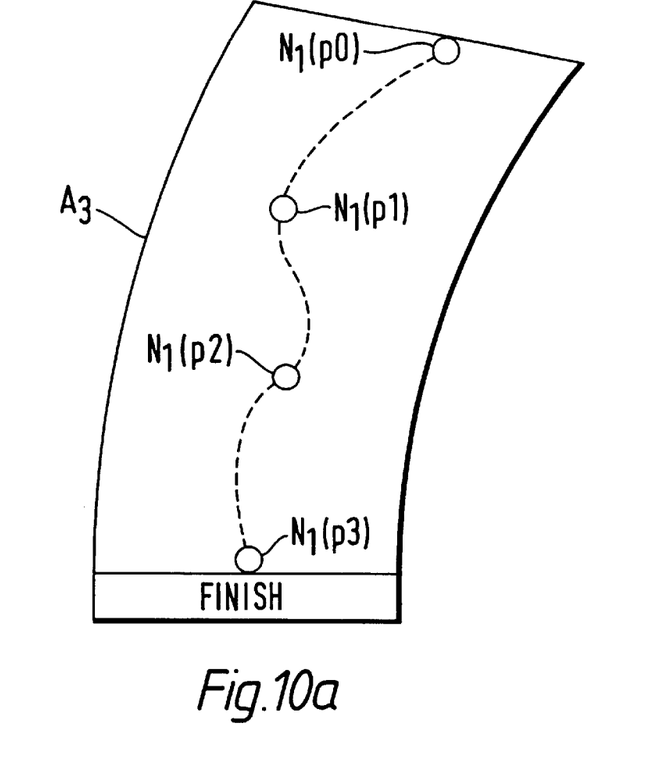
Figure 10B:
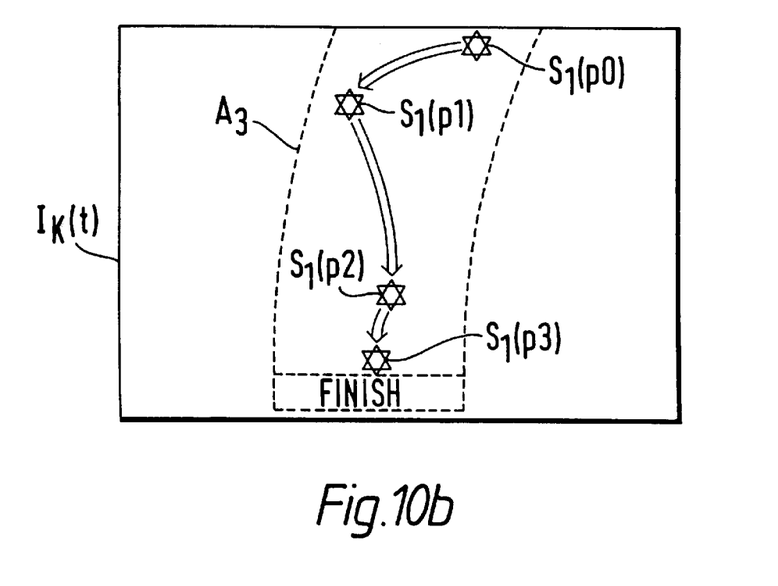

Nor is it a condition that the synthetic track should only be shown in natural television pictures, and, as illustrated in FIG. 9c, the actual television picture may be a synthetic television picture $I_K(S)$ produced, e.g., by a video generator, not necessarily with a view to representing the camera perspective, but it may be some kind of graphic representation of the area A. FIG. 9c shows a graphic representation $A_S$ of the field A reproduced in an X,Y plane in the form of a synthetic television picture. The movement of the natural object N is then shown projected in the X,Y plane as the movement of the synthetic object S from the position $p_0$ to position $p_3$. A person skilled in the art will easily see that it will be possible to use different perspectives, such as a side view, or also possibilities of manipulating the picture with the synthetic object and the synthetic track by means of various video graphic methods. Nor is there any reason why, on the basis of the data acquired for the position and the movement of the natural object N during the course of the game, the path of the natural object should not be presented during the course of a game or during a selected period, thus aiding the analysis of the game. The technique may also be employed by meeting officials and referees in order to judge situations which otherwise would be difficult to assess if the judgement alone were to be based on momentary impressions during the course of the game.

Figure 11A:
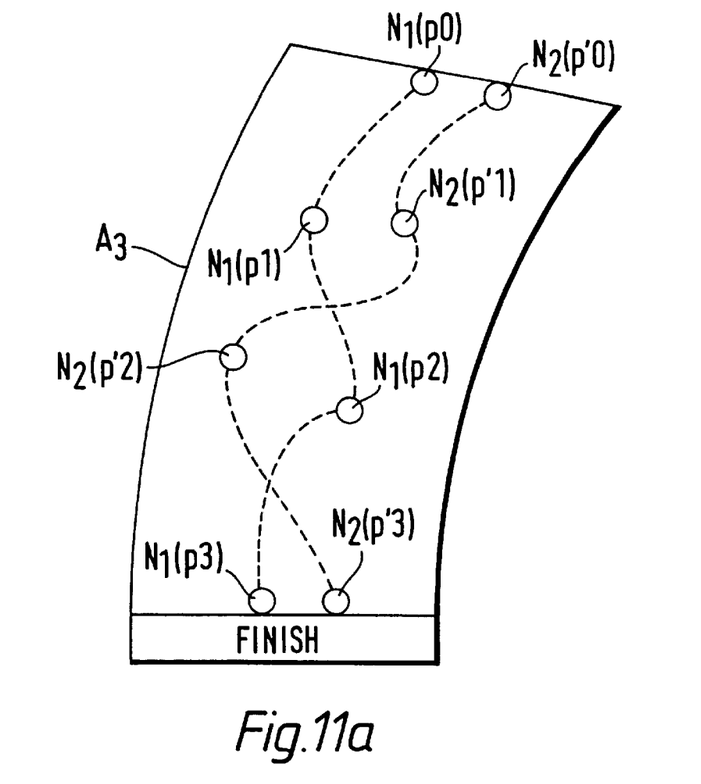
Figure 11B:
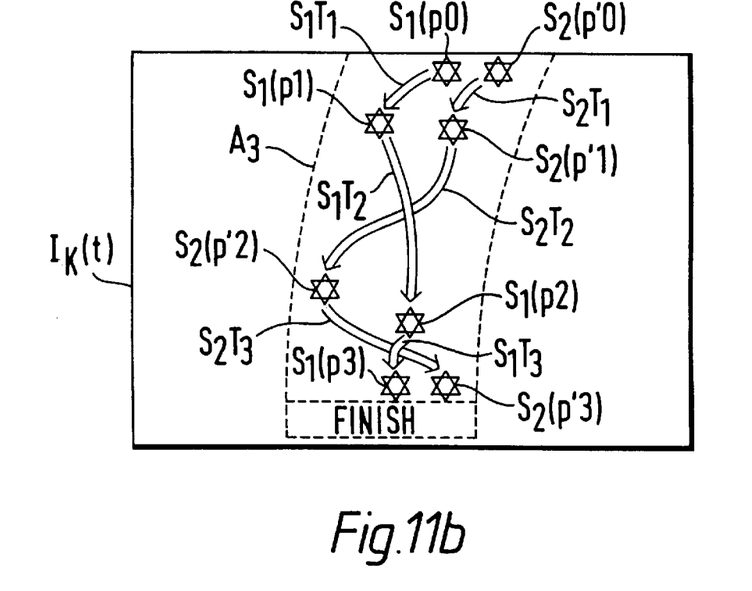

As mentioned, there is no reason why the system should not detect and monitor a number of natural objects $N_1, \ldots N_n$, the natural objects being unambiguously defined by the use of transponders which emit coded reply signals which unambiguously identify the natural object concerned. FIG. 11a refers to a situation which could arise in an area as illustrated in FIG. 8. Two natural objects N have moved through the partial area $A_3$, but during different periods. The first natural object $N_1$, e.g. has moved from the position $p_0$ to the position $p_3$ during the period $\theta$, while the natural object has moved from the position $p'_0$ to the position $p'_3$ during the period $\theta'$. The paths of the natural objects are indicated as broken lines in FIG. 9a. In FIG. 9b the detected and calculated paths of the natural objects $N_1$, $N_2$ are represented by the corresponding synthetic objects $S_1$, $S_2$ and converted to synthetic tracks for the objects $S_1$, $S_2$, being illustrated simultaneously in one and the same picture $I_K(t)$ at the time t. Data for times and speeds which form the basis for a comparison between the movement of the objects $N_1$, $N_2$, for example Alpine skiers, can be introduced into the picture. The X,Y projection of the partial area $A_3$ in the picture plane $I_K$ at the time T will appear as the picture $I_K(t)$ illustrated in FIG. 11b and choice of line and skiing style can, e.g. be directly compared.

It will be obvious to a person skilled in the art that it is possible to create a real time reproduction, i.e. the development, e.g., of a game or race can be followed in simulated real time by means of synthetic objects and synthetic tracks in the television picture. This may occur, e.g. in connection with a playback, but when using the method and the system according to the present invention, the producer of the television broadcast has a great deal of freedom to manipulate objects and information as they are displayed either in natural or synthetic television pictures. It will be possible, e.g., to combine synthetic tracks and synthetic objects with various forms of animation graphics, if so desired.

As shown in FIG. 1 and FIG. 8, transponders $T_K$ are installed in various fixed positions in the area A for calibration of the system. As mentioned above, transponders may also be installed both in the position detectors D and in the cameras K. In the latter case movable or mobile cameras can be employed, i.e. cameras which are not mounted in a fixed position, and may be of the type "Handycam" or "Steadycam". These cameras must also naturally be connected to data processing devices Q via data buses B, or local data buses, in which case they may expediently be based on a wireless connection.

The method and the system according to the present invention are not necessarily limited to sports reports, but may be applied in a number of other kinds of television transmissions. It will also be possible to employ the method and the system in transmissions which are not restricted to fixed and specific areas, e.g. in connection with nature programs on television. If the natural object is located beyond the range of the position detectors, but within the field of view of a camera, the position of the natural object must be determined by other means. In this case the natural object may be equipped with a GPS (Global Positioning System) receiver for determination of the position, this being remotely read at the production location. Similarly, the position of a mobile camera, which is also located beyond the range of the position detectors, is determined by means of GPS and transferred to the production location. Positions and paths for the natural object can then be calculated according to the method in the present invention, and the natural object is represented by a synthetic object which is inserted in the correct position in a television picture recorded by a camera where the natural object is located in the picture field. An example of such an application in nature reports may be, e.g., animals which are equipped with radio transmitters and GPS receivers and are followed, e.g., by a helicopter-borne "Steadycam". Even though the natural object may be hidden by obstacles which prevent it from being viewed directly in the television picture, its position and movement can still be indicated by a synthetic object or a synthetic track which is inserted in the television picture. In such cases the positioning accuracy is not particularly critical and may well amount to several meters, or possibly several tens of meters. Such a positioning accuracy lies within the range of possibility when using GPS at its highest time resolution.

As stated, in principle the natural objects, which have to be detected and displayed represented as synthetic objects and possibly represented in motion as synthetic tracks, may be practically anything at all. In sports competitions, e.g., the competitors may also be equipped with transponders and their positions and movement are detected and displayed. Since the transponder's reply signal may be in the form of an unambiguous code, the identification of the transponder will also be unambiguous and the necessary identification information can naturally be shown in the television picture in some way or other, such as by showing the portrait of the competitor overlaid a part of the television picture.

The use of the method and the system according to the present invention in television broadcasts and television reports will be capable of being implemented in other circumstances than those herein described, and it should also be understood that the methods and the system according to the present invention for displaying and representing the natural object and its movement in the form of a synthetic object in a television picture and a synthetic track for the synthetic object can be realised in a number of different variants and varying attributes which are not expressly indicated here, but which nevertheless will be obvious to those skilled in the art and which fall within the scope of the present invention.

What is claimed is:

1. A method for manipulation of at least one movable, natural object in a natural television picture, wherein the television picture is generated by one or more television cameras, characterized by detecting the distance between the object and at least 2 fixed basic positions in a preselected x,y,z co-ordinate system at a time t, each basic position corresponding to a known position of a detector, determining an x,y,z co-ordinate for the object in the preselected x,y,z co-ordinate system at the time t, determining the distance between the camera's lens centre and the object at the time t as an object vector in the preselected co-ordinate system, determining the television camera's optical axis in the preselected co-ordinate system at the time t as a camera vector in the preselected co-ordinate system, determining a line from the television camera's lens centre to the point of intersection between the edge of the generated television picture and the plane formed between the object vector and the camera vector at the time t as a zoom vector, the object vector being located between the camera vector and the zoom vector when the object is visible in the television picture at the time t, and when the object is not visible in the television picture at the time t, the zoom vector is located between the camera vector and the object vector, and determining an X,Y position of the object referred to the television camera's picture plane and the camera vector on the basis of the object vector and the camera vector at the time t, and if the object vector is located between the camera vector and the zoom vector, to insert a synthetic object in the X,Y position in the television picture at the time t, the synthetic object constituting a representation of the natural object recorded by the camera at the time t, or, if the zoom vector is located between the camera vector and the object vector at the time t, to insert a symbol in the television picture, the symbol indicating the location of the X,Y position of the natural object outside the edge of the picture referred to the television camera's picture plane and the camera vector.

2. A method according to claim 1, characterized in that the distance between the object and the basic positions, together with the object's x,y,z co-ordinate are determined by trilateration.

3. A method according to claim 1, characterized in that there are employed 2 fixed basic positions in the preselected x,y,z co-ordinate system if the natural object is located for every value of t in a plane defined by the fact that one of the co-ordinates x,y,z of the natural object is equal to zero, or that at least 4 fixed basic positions are employed in the preselected x,y,z co-ordinate system if the natural object is located for at least one or some values of t in a space defined by the fact that none of the co-ordinates x,y,z is equal to 0, thus obtaining an unambiguous determination of the natural object's x,y,z co-ordinate at time t.

4. A method according to claim 1, characterized in that the synthetic object is either created with given attributes for size, shape and colour, or that the synthetic object's attributes are freely selected, or that the synthetic object's attributes are chosen within preselected limits, or that the synthetic object's attributes are determined on the basis of respective reference values for the attributes.

5. A method according to claim 4, wherein the synthetic object's attributes are determined on the basis of respective reference values for the attributes, characterized in that the synthetic object's attributes are manipulated automatically on the basis of setting values for the television camera such as camera angle and zoom setting and on the basis of the colour of the background of the natural object as shown in the television picture.

6. A method according to claim 1, characterized in that the synthetic object is assigned alphanumerical or symbolic signs which indicate the value of one or more parameters of the represented natural object, and the parameters may be constants which identify the natural object or dynamic values such as the object's momentary x,y,z position, distance to a freely selected fixed point, course and speed.

7. A method according to claim 1, characterized in that the settings of the television camera such as camera angle and zoom setting are controlled in approximate real time on the basis of the calculated X,Y position of the natural object at the time t and referred to the camera's picture plane and the camera vector, with the result that the natural object is located within the edge of the picture of the generated television picture at any time t, the control being performed via a control system assigned to the camera.

8. A method according to claim 7, wherein more than one camera is employed, characterized in that a choice is made via the control system as to which camera should be employed to generate the television picture which is shown at time t.

9. A method for generating at least one synthetic track in a television picture, wherein the synthetic track represents the path of a movable, natural object in a natural television picture during a given period θ, and wherein a method is employed for manipulating the movable, natural object in the television picture as indicated in claim 1, characterized by calculating the path of the natural object on the basis of detected positions x,y,z for the a natural object in the preselected x,y,z co-ordinate system at the time t, where t∈θ, converting the detected positions at the time t to an X,Y position in the television camera's picture plane at the time t, and generating the synthetic track in the television picture as the connecting line between all X,Y positions of the natural object in the picture planes of the natural television pictures which are recorded sequentially during the period θ.

10. A method according to claim 9, characterized in that the synthetic track is generated and updated continuously for each individual picture which is recorded during the period θ.

11. A method according to claim 10, characterized in that the synthetic track is generated and displayed as the path of the natural object during the period θ in a freely selected television picture which forms a background for the natural object, the X,Y positions being scaled for each time t∈θ and assigned to the picture plane of the freely selected television picture.

12. A method according to claim 11, characterized in that the freely selected television picture is a natural television picture, the freely selected television picture forming part of the sequence of the natural television pictures which are recorded during the period θ, or that the freely selected television picture is a synthetic television picture.

13. A method according to claim 9, characterized in that the X,Y positions for one or more of the times t are indicated on the synthetic track, the indication of the X,Y position in the synthetic track being formed as a synthetic object with given attributes for size, shape and colour, and in such a manner that the synthetic object constitutes a representation of the natural object recorded by the camera at the time t∈θ.

14. A method according to claim 13, characterized in that the indication of the X,Y positions or the synthetic object is assigned alphanumerical or symbolic signs which indicate the value or one or more parameters for the represented natural object, and the parameters may be constants which identify the natural object or dynamic values such as the object's momentary x,y,z position, distance from a freely selected fixed point, course and speed at the time t∈θ.

15. A system for implementing the method for manipulation of at least one movable, natural object (N) in a natural television picture, wherein the television picture is generated by one or more television cameras (K), together with implementation of the method for generating a synthetic track in a television picture, wherein the synthetic track represents the path of a movable, natural object in the television picture during a given period θ, and wherein a method is employed for manipulating the movable, natural object in the television picture, characterized in that the system comprises a transponder (T) provided in the natural object (N) and arranged to react to an optical, acoustic or electromagnetic signal received by the transponder with transmission of a response signal, at least one position module (M) with at least 2 position detectors (D) for transmitting optical, acoustic or electromagnetic signals and receiving response signals from the transponder (T) and provided in respective basic positions in a preselected x,y,z co-ordinate system, together with a signal processor (1) arranged to determine the distance between a position detector (D) and the object (N) at a time t, a computing module (2) connected with the signal process (1) and arranged to calculate the x,y,z co-ordinates for the object (N) in the preselected co-ordinate system at the time t and on the basis of the calculated x,y,z co-ordinates for a number of times t to calculate a path for the object (N), together with an object vector ($V_N$) given by the distance between the camera's (K) lens centre and the object (N) at the time t, a camera vector ($V_K$) given by the camera's (K) optical axis at the time t and a zoom vector ($V_z$) between the camera's lens centre and the point of intersection (Z) between the edge of the picture and the plane formed between the object vector ($V_N$) and the camera vector ($V_K$) at the time t, the object vector ($V_N$) being either located between the camera vector ($V_K$) and the zoom vector ($V_Z$) or the zoom vector ($V_Z$) between the camera vector ($V_K$) and the object vector ($V_N$), a camera control system (3) connected with the computing module (2) and arranged to detect or generate values for the camera settings, and a manipulator module (4) connected with the camera control system (3) and the computing module (2) arranged to a) create a synthetic object (S) in an X,Y position for the natural object (N) in the recorded television picture at the time t, the synthetic object )S) constituting a representation of the natural object (N) recorded by the camera at the time t or b) create a symbol n the television picture, the symbol indicating the X,Y position for the natural object outside the edge of the picture at the time t, c) generate and select attributes for the synthetic object (S), or d) generate at the time t a synthetic track in a recorded or generated television picture, the synthetic track representing the path for the natural object (N) during a period θ before or up to the time t.

16. A system according to claim 15, characterized in that the system comprises a number of position modules (M) each of which is assigned to one or more respective television cameras (K), each position module (M) being arranged to cover a predefined area in the x,y,z co-ordinate system.

17. A system according to claim 15, characterized in that the position detector (D) comprises a microwave transceiver and an antenna (II) for transmission and receipt of microwave signals, and that there is further provided a transponder T in each of the position detectors (D) and/or in each of the cameras (K) respectively.

18. A system according to claim 17, wherein each said position module comprises at least 4 position detectors (D1, . . . D4) for unambiguous determination of the x,y,z co-ordinates for the object (N) at the time t.

19. A system according to claim 15, characterized in that the transponder (T) is either a passive transponder, or an active transponder, the active transponder being a surface wave component (SAW component), and that the response signal from the active transponder (T) in each case constitutes a code which unambiguously identifies the transponder by delaying the response signal from the active transponder (T) by a predetermined value $\tau_d$ in relation to the time of receipt of a signal which causes the response signal to be transmitted form the transponder.

20. A system according to claim 15, characterized in that the camera control system (3) comprises a control loop for automatic control of camera settings in approximate real time, the camera settings being influenced via a regulator module (R) provided on the camera (K) which module further comprises sensors for detection of the camera settings, and/or that the manipulator module (4) comprises a device for automatic generation of attributes for the synthetic object.

\* \* \* \* \*